(12) United States Patent
Fuchs

(10) Patent No.: US 6,306,017 B1
(45) Date of Patent: Oct. 23, 2001

(54) METHOD AND MACHINING TOOL FOR PRODUCING HELICALLY PROFILED WORKPIECES

(75) Inventor: Erwin Fuchs, Altmünster (AT)

(73) Assignee: Weingärtner Maschinenbau Gesellschaft m.b.H., Kirchham (AT)

( * ) Notice: Subject to any disclaimer, the term of this patent is extended or adjusted under 35 U.S.C. 154(b) by 0 days.

(21) Appl. No.: 09/436,287

(22) Filed: Nov. 8, 1999

(30) Foreign Application Priority Data

Nov. 30, 1998 (AU) .................................... 2010/98

(51) Int. Cl.$^7$ ............................................. B24B 1/00
(52) U.S. Cl. ................................... 451/48; 451/180
(58) Field of Search ...................... 451/48, 51, 178, 451/180, 242, 243, 246, 251, 57; 409/132

(56) References Cited

U.S. PATENT DOCUMENTS

| | | | |
|---|---|---|---|
| 3,490,884 | * 1/1970 | Brierley | 451/180 |
| 3,673,739 | * 7/1972 | Giardini | 451/180 |
| 3,722,146 | * 3/1973 | Rodriquez et al. | 451/180 |
| 3,742,652 | * 7/1973 | Enders | 451/180 |
| 3,769,757 | * 11/1973 | Sunday, Jr. | 451/180 |
| 3,769,878 | * 11/1973 | Servanty | 90/20 |
| 3,916,582 | * 11/1975 | Costil | 51/288 |
| 4,144,678 | * 3/1979 | Ellwanger et al. | 51/288 |
| 4,406,090 | * 9/1983 | Schian et al. | 51/95 R |
| 4,442,637 | * 4/1984 | Ahejew | 51/288 |
| 4,546,575 | * 10/1985 | Adams | 51/288 |
| 4,642,942 | * 2/1987 | Guhring | 51/100 R |
| 4,760,635 | * 8/1988 | Miller | 29/558 |
| 4,815,239 | * 3/1989 | Sommer | 51/165.71 |
| 5,255,475 | * 10/1993 | Kotthaus | 51/206 P |
| 5,738,564 | * 4/1998 | Helle et al. | 451/11 |
| 5,807,164 | * 9/1998 | Junker | 451/47 |
| 5,938,381 | * 8/1999 | Diehl et al. | 409/132 |

FOREIGN PATENT DOCUMENTS 29 45 611   10/1980   (DE) .
202 643    9/1983   (DE) .

* cited by examiner

Primary Examiner—Derris H. Banks
Assistant Examiner—Hadi Shakeri
(74) Attorney, Agent, or Firm—Collard & Roe, P.C.

(57) ABSTRACT

For producing hectically profiled workpieces (1) the helical profile (2) is first of all prefabricated by a milling treatment and is then finished by a grinding treatment of the profile surface. To achieve optimum machining qualities in an economic way, the grinding treatment is performed with a grinding tool (6, 12) adapted to the milling tool (3, 9) for the milling treatment in terms of shape, size, position of the axis of rotation and cutter arrangement.

3 Claims, 1 Drawing Sheet

METHOD AND MACHINING TOOL FOR PRODUCING HELICALLY PROFILED WORKPIECES

FIELD OF THE INVENTION

This invention relates to a method of producing hectically profiled workpieces, according to which first of all the helical profile is prefabricated by a milling treatment and is then finished by a grinding treatment of the profile surface, as well as to a machining tool for performing this method.

DESCRIPTION OF THE PRIOR ART

Hectically profiled workpieces substantially include worm gears, threaded spindles, worm conveyors, screws for producing plastic materials, pump and compressor rotors and the like, where the helical profile of these workpieces must be produced with high accuracy and perfect surface quality. By means of a milling treatment the helical profile can be prefabricated economically, but milling provides a profile surface of mostly insufficient quality, so that a subsequent grinding treatment is required.

In various cases, grinding into the solid material, referred to as deep grinding, might provide for a fabrication of profiles without additional fine grinding, which deep grinding is, however, rather time-consuming and involves quite restricted machining depths. There is also produced grinding sludge which is difficult to dispose of, and due to the high thermal load hardening cracks may occur.

For finishing the prefabricated helical profiles there is frequently performed a grinding treatment by means of belt grinding due to the low machining depth, for which purpose two different machine tools, namely a milling machine and a belt grinding machine, are required. But when the helical profile is provided with a wear-resistant layer, which due to its surface roughness must be regrouped, this reminding must be effected with a grinding disk, as the wear-resistant layer is too hard for belt grinding. Such grinding disk does, however, not forgive any feed-related deviations with respect to the milled surface, which in the case of reminding leads to the risk of a local straight-through grinding of the wear-resistant layer.

It is therefore the object underlying the invention to provide a method as described above, which in an economic way ensures a fabrication of helical profiles of perfect surface quality. There should also be created a grinding tool optimally suited for performing this method.

SUMMARY OF THE INVENTION

This object is solved by the invention in that the grinding treatment is performed by means of a grinding tool adapted to the milling tool for the milling treatment in terms of shape, size, position of the axis of rotation and cutter arrangement. By means of this both simple and elegant measure the advantages of the milling treatment, such as great chip removal and fast machining operation as well as the lack of a problematic grinding sludge, can be optimally combined with the advantages of grinding by means of a hard grinding disk, such as achieving a very smooth surface with constant grinding depth, where due to the similarity of the tool design for the milling treatment on the one hand and the grinding treatment on the other hand identical machining conditions are obtained both for milling and for grinding, and the grinding treatment can exactly be adapted to the preceding milling treatment, which leads to optimum surface qualities.

To be able to utilize fluidized-bed milling as the fastest of the machining operations for prefabricating profiles, the fabrication of profiles is effected by fluidized-bed milling and the finishing of profiles is effected by an adapted fluidized-bed grinding, so that the surface produced by the grinding operation is also exactly adapted to the surface produced by the milling operation. Such surface adaptation could not be achieved by means of a usual peripheral grinding operation, because the surface achieved by fluidized-bed grinding follows quite specific stock utilization rules, which can only be observed by a tool equipped with inwardly directed cutting edges.

Since due to the similarity of milling tool and grinding tool the condition is satisfied that prefabrication and finishing of the helical profile must be performed in a similar way, the milling and grinding treatments can be performed in accordance with the invention during a uniform clamping of the workpiece in a machine tool, where it is basically possible to perform the milling and grinding treatments with tools fitted with cutting edges at their end faces, on their outer periphery or on their inner periphery.

Known grinding tools have a main body rotatable about a tool axis, which on its periphery accommodates an annular grinding body. When there is provided a disk-shaped main body with a grinding body attached at the outer periphery, there can be provided a grinding tool adapted to a peripheral milling cutter. When the annular main body is equipped with the grinding body at its inner periphery, there is obtained a grinding tool comparable to a fluidized-bed tool which can be used for fluidized-bed grinding upon fluidized-bed milling. The cross-section of the grinding body will each be adapted to the cutting contour determined by the cutting edges of the fluidized-bed milling cutter, so as to ensure mutually adapted machining conditions.

BRIEF DESCRIPTION OF THE DRAWING

In the drawing, the subject-matter of the invention is represented by way of example, wherein.

DESCRIPTION OF THE PREFERRED EMBODIMENT

To be able to economically produce a cylindrical or conical workpiece 1 with a helical profile 2, the helical profile 2 is first of all prefabricated by a milling treatment and is then finished by a grinding treatment of the profile surface.

Figure 1:
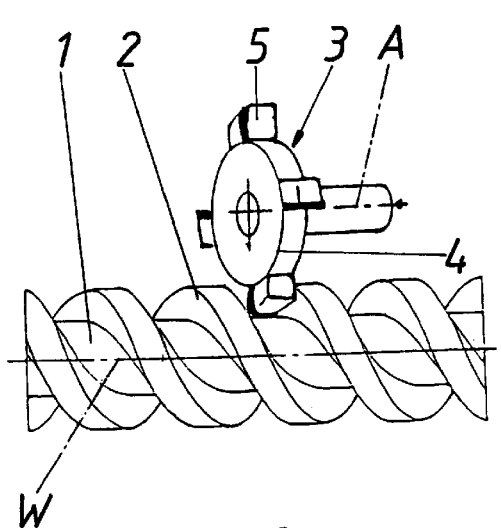
FIGS. 1 and 2 each schematically illustrate the execution of the invention manufacturing method in two method steps by using a milling and a grinding tool, and FIGS. 3 and 4 likewise schematically illustrate the same method steps by using other milling and grinding tools.
Figure 2:
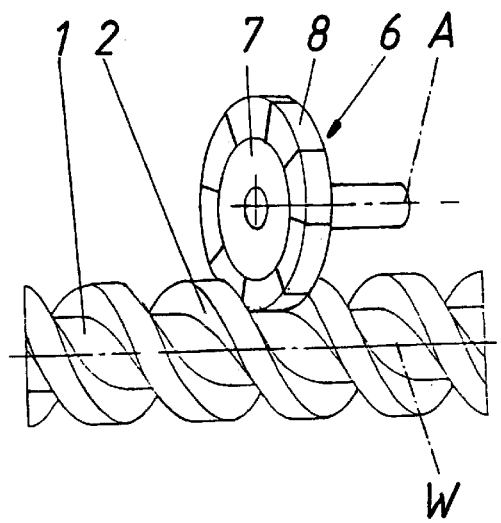

As is illustrated in FIGS. 1 and 2, the milling treatment is effected by means of a peripheral milling cutter 3, which includes a disk-shaped main body 4 rotating about the axis A and having radially outwardly directed knives 5, where the tool axis A lies in a plane that is parallel to the workpiece axis W. For the subsequent finishing an external grinding tool 6 is used, which is adapted to the peripheral milling cutter 3 in terms of shape, size, position of the axis of rotation and cutter arrangement and accordingly has a disk-shaped main body 7 which rotates about the tool axis A and includes an annular grinding body 8 seated at the outer periphery, where the cross-section of the grinding body 8 corresponds to the cutting contour of the knife 5.

Figure 3:
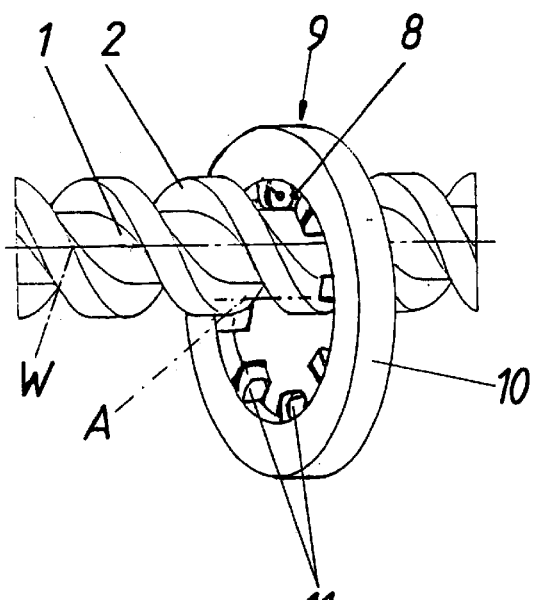
Figure 4:
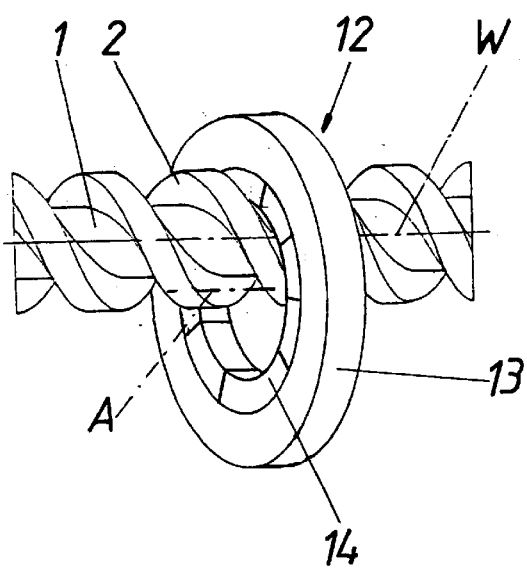

As is indicated in FIGS. 3 and 4, prefabricating the helical profile 2 may also be effected by means of a fluidized-bed milling cutter 9, which includes an annular main body 10 rotating about the tool axis A and having radially inwardly directed knives 11. The subsequent finishing is then correspondingly performed with a fluidized-bed grinding tool 12, which includes an annular main body 13 rotating about the tool axis A and a grinding body 14 disposed at the inner periphery, where the cross-section of the grinding body 14 in turn is adapted to the cutting contour of the knife 11.

Since the milling and grinding tools are adapted to each other in terms of shape, size, position of the axis of rotation and cutter arrangement, the milling and grinding treatments for producing the helical profile can be performed on one and the same machine tool, where the machining conditions necessarily are the same, so that optimum machining qualities can be achieved.

What is claimed is:

1. A method of producing a workpiece with a hectically profiled circumference, which comprises the steps of
   (a) first prefabricating the hectically profiled circumference in a milling treatment with a milling tool having a cutter arrangement by moving the milling tool about the circumference in a helical path while rotating the tool about an axis of rotation, and
   (b) subsequently finishing the hectically profiled circumference in a grinding treatment with a grinding tool having a cutter arrangement by moving the grinding tool about the prefabricated circumference in the helical path while rotating the tool about an axis of rotation,
      (1) the milling tool and the grinding tool matching with respect to shape, size, position of the axis of rotation and cutter arrangement.

2. The method of claim 1, wherein the milling treatment is effected by vortex milling and the grinding treatment is effected by a matched vortex grinding with inwardly directed cutter arrangements contacting the circumference.

3. The method of claim 1, wherein the workpiece is uniformly clamped in a machine tool during the milling and grinding treatments.

* * * * *

UNITED STATES PATENT AND TRADEMARK OFFICE
CERTIFICATE OF CORRECTION

PATENT NO. : 6,306,017 B1
DATED : October 23, 2001
INVENTOR(S) : Erwin Fuchs

It is certified that error appears in the above-identified patent and that said Letters Patent is hereby corrected as shown below:

<u>Title page,</u>
Item [30], the Foreign Priority Data correctly should read:

-- Nov. 30, 1998    (AT) .....................2010/98--.

Signed and Sealed this

Eleventh Day of June, 2002

*Attest:*

*Attesting Officer*

JAMES E. ROGAN
*Director of the United States Patent and Trademark Office*